No. 11,688. Reissued Aug. 23, 1898.

A. F. MIDDAUGH, A. T. HOEVET & F. T. ANDERSON.

COMBINATION WHISK BROOM.

(Application filed Feb. 15, 1897.)

WITNESSES:

Hermann Heinz.

Alfred Meltzer.

INVENTORS.

Asa F. Middaugh.

Francis T. Anderson.

Alfred T. Hoevet.

BY Wm R. Rummler, their ATTY.

THE NORRIS PETERS CO., PHOTO-LITHO., WASHINGTON, D. C.

UNITED STATES PATENT OFFICE.

ASA F. MIDDAUGH, ALFRED T. HOEVET, AND FRANCIS T. ANDERSON, OF DENVER, COLORADO, ASSIGNORS TO THE ECONOMY BROOM COMPANY, OF SAME PLACE.

COMBINATION WHISK-BROOM.

SPECIFICATION forming part of Reissued Letters Patent No. 11,688, dated August 23, 1898.

Original No. 538,177, dated April 23, 1895. Application for reissue filed February 15, 1897. Serial No. 623,567.

*To all whom it may concern:*

Be it known that we, ASA F. MIDDAUGH, ALFRED T. HOEVET, and FRANCIS T. ANDERSON, citizens of the United States of America, residing at Denver, in the county of Arapahoe and State of Colorado, have invented certain new and useful Improvements in a Combination Whisk-Broom; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to improvements in combination whisk-brooms; and it consists of the features hereinafter described and claimed, all of which will be fully understood by reference to the accompanying drawings, in which is illustrated an embodiment thereof.

Figure 1:
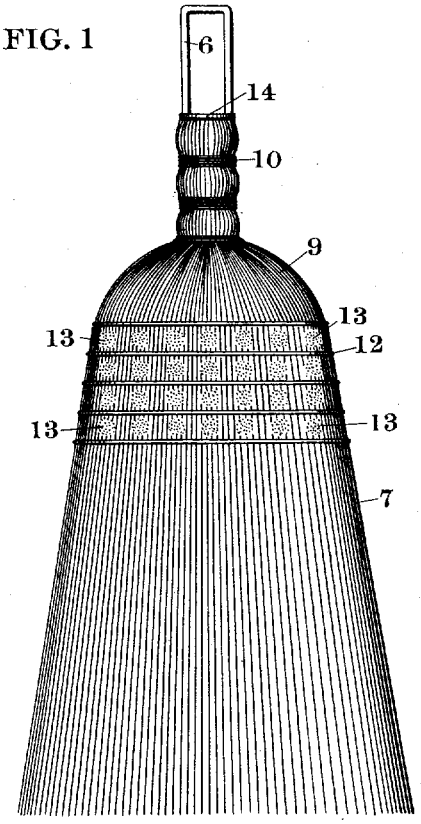
Figure 2:
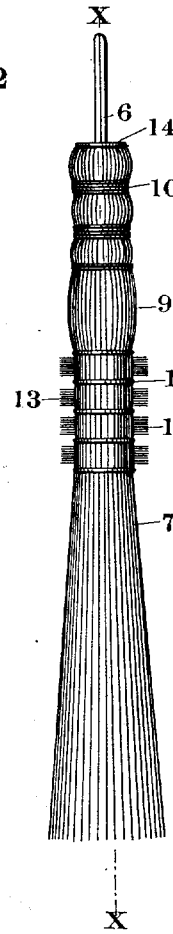
Figure 3:
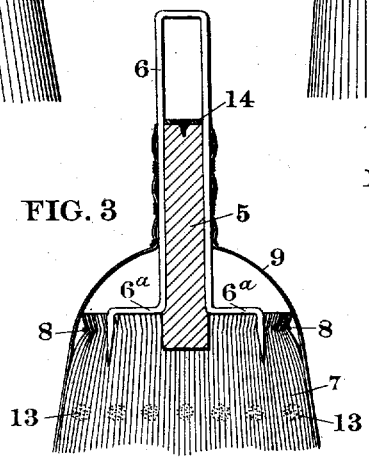
Figure 4:
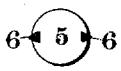

In the drawings, Figure 1 is a side view of our improved whisk-broom. Fig. 2 is an edge view of the same. Fig. 3 is a section taken on the line *x x*, Fig. 2, and partly broken away. Fig. 4 is a cross-section taken through the wire portion of the handle, the wood part being shown in end elevation.

Similar reference characters indicate corresponding parts in the views.

The numeral 5 designates the wood part of the handle, which is grooved on diametrically opposite sides to receive an embracing wire 6, which projects above the wood part 5, being bent to form a loop which may be passed over a nail or other supporting device upon which the broom is hung.

Near the lower extremity of the wood part the wire 6 is bent outwardly, forming shoulders $6^a$, engaging the top of the inner part 7 of the brush, and then downwardly, terminating in sharpened extremities, which project into the inner part of the brush on each side of the lower extremity of the wood part 5. The wire 6 thus forms a strengthening-brace for the brush and prevents it from getting loose on the handle.

The part 7 of our improved broom is wired in the usual manner, as shown at 8. The outer part 9 of the brush conceals the shoulders $6^a$ of the wire. This part of the brush is applied and wired in the ordinary way, as shown at 10 and 12.

The wire part 6 of the handle is preferably formed angular in cross-section, whereby a scraping edge is provided, so that the loop or exposed top part becomes a most efficient instrument for loosening and removing thick dirt spots from garments, said spots resulting from spattering the garment with muddy water. These dry dirt spots cannot be removed in the first instance by applying the brush, but must be loosened by some other instrument.

The protruding loop part of the wire is preferably triangular in cross-section, as shown in Fig. 4, and it is applied to the dry dirt spots preparatory to brushing, thus forming a most convenient and handy attachment for a whisk-broom. It will be readily understood that this attachment possesses advantages over any separate or detached instrument for the purpose stated.

In the form shown an outer scraping edge is provided on each side of the loop and extends over the top, and a pair of scraping edges project from either side of the plane of the loop, as shown in Figs. 2 and 4, the plane of the loop being on the line *x x*, Fig. 2.

In removing dirt from cloth the loop is preferably laid flat upon the surface, so as to bring two scraping edges into use. The top edge is particularly adapted for removing dirt from parts to which the loop cannot be applied flat, such as the top of a hat-rim or the creases in plaited cloth.

It is often desirable, as when removing dirt or cleaning fine garments, to have a brush of finer quality than a whisk-broom. This may be supplied by securing bunches 13 of bristles of any desired quality to the upper part of the whisk-broom, thus forming a brush whose bristles extend approximately at right angles to the body of the brush. These bristles 13 may be secured in any suitable manner, as by passing them transversely through the upper part of the broom and applying the wires 13 on each side, whereby the bristles of the auxiliary brush are held securely in place.

To the top of the wood part 5 of the handle is attached a metal cap-plate 14, which is notched to receive the parallel members 7 of the wire 6, and thus add strength and security to the handle.

Having thus described our invention, what we claim is—

1. As an improved article of manufacture, a whisk-broom provided with a wire embracing the wood part of the handle, and bent outwardly from the lower portion of the wood part, and downwardly into the inner part of the brush, substantially as described.

2. As an improved article of manufacture, a whisk-broom provided with an integral wire brace having an exposed loop at the top, its lower part being shouldered and terminating in depending points projecting into the body of the broom, substantially as described.

3. As an improved article of manufacture, a whisk-broom provided with a combined hanger and dirt-removing device, attached to the handle, said device consisting of a hanging-loop having thereon an outer scraping edge, substantially as described.

4. As an improved article of manufacture, a whisk-broom provided with a combined hanger and dirt-removing device attached to the handle, and projecting above same; said device consisting of a wire, triangular in cross-section, bent double, with the angular edges projecting outwardly, and providing scraping edges, substantially as described.

5. As an improved article of manufacture, a whisk-broom provided with a combined hanger and dirt-removing device attached to the handle and projecting above same; said device consisting of a wire, having opposite scraping edges extending longitudinal of same, and bent into a loop with one of said edges projecting on either side of the plane of the loop, substantially as described.

ASA F. MIDDAUGH.
ALFRED T. HOEVET.
FRANCIS T. ANDERSON.

Witnesses as to the signatures of Asa F. Middaugh and Alfred T. Hoevet:

Mrs. M. HOEVET,
BURT D. MASON.

Witnesses as to the signature of Francis T. Anderson:

WM. R. RUMMLER,
F. L. WICK.